May 6, 1941.　　　　F. J. YOUNG　　　　2,240,737
DRAWWORKS
Filed April 14, 1937　　　3 Sheets-Sheet 1
Fig. 1
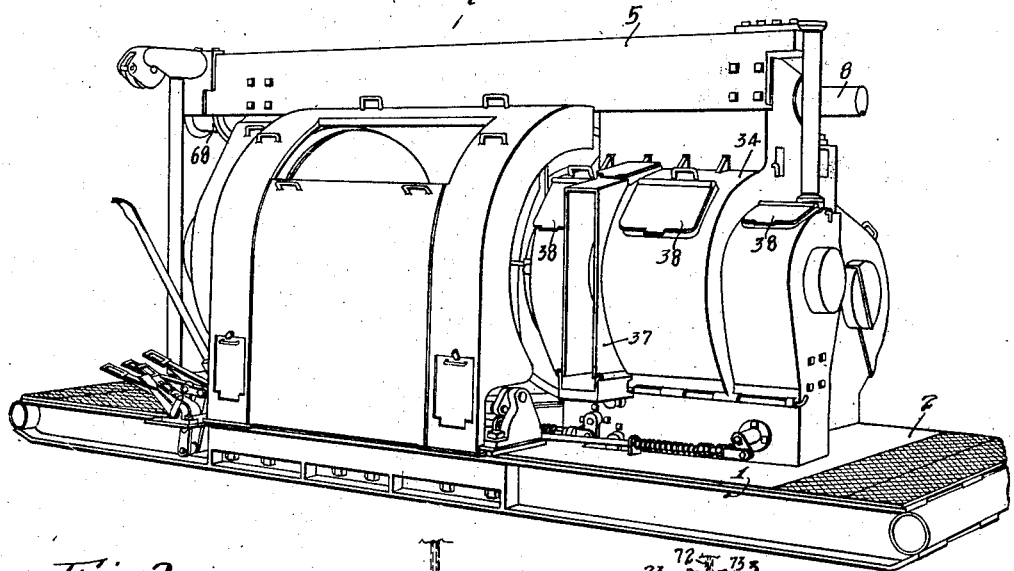
Fig. 2
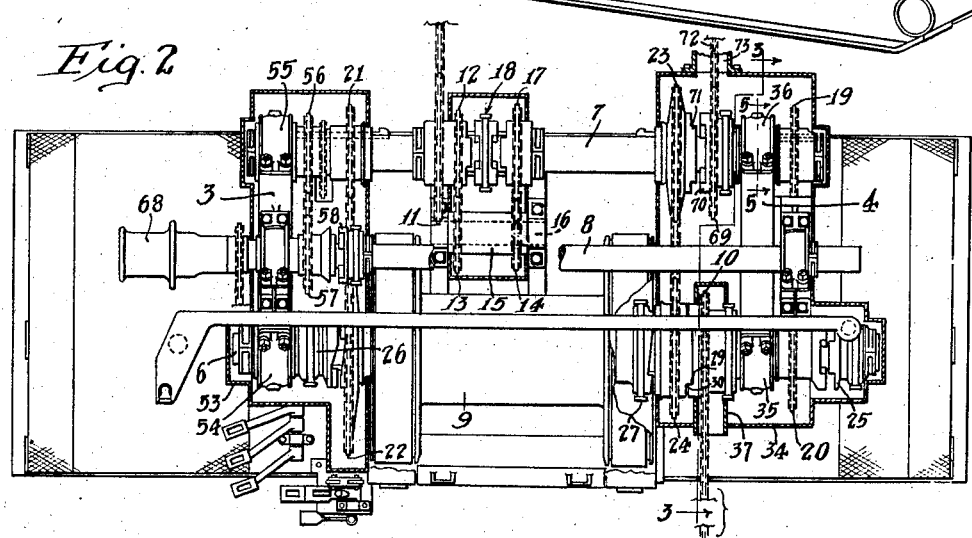
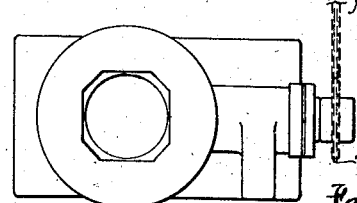
Inventor
Forrest J. Young
By Lyon & Lyon
Attorneys

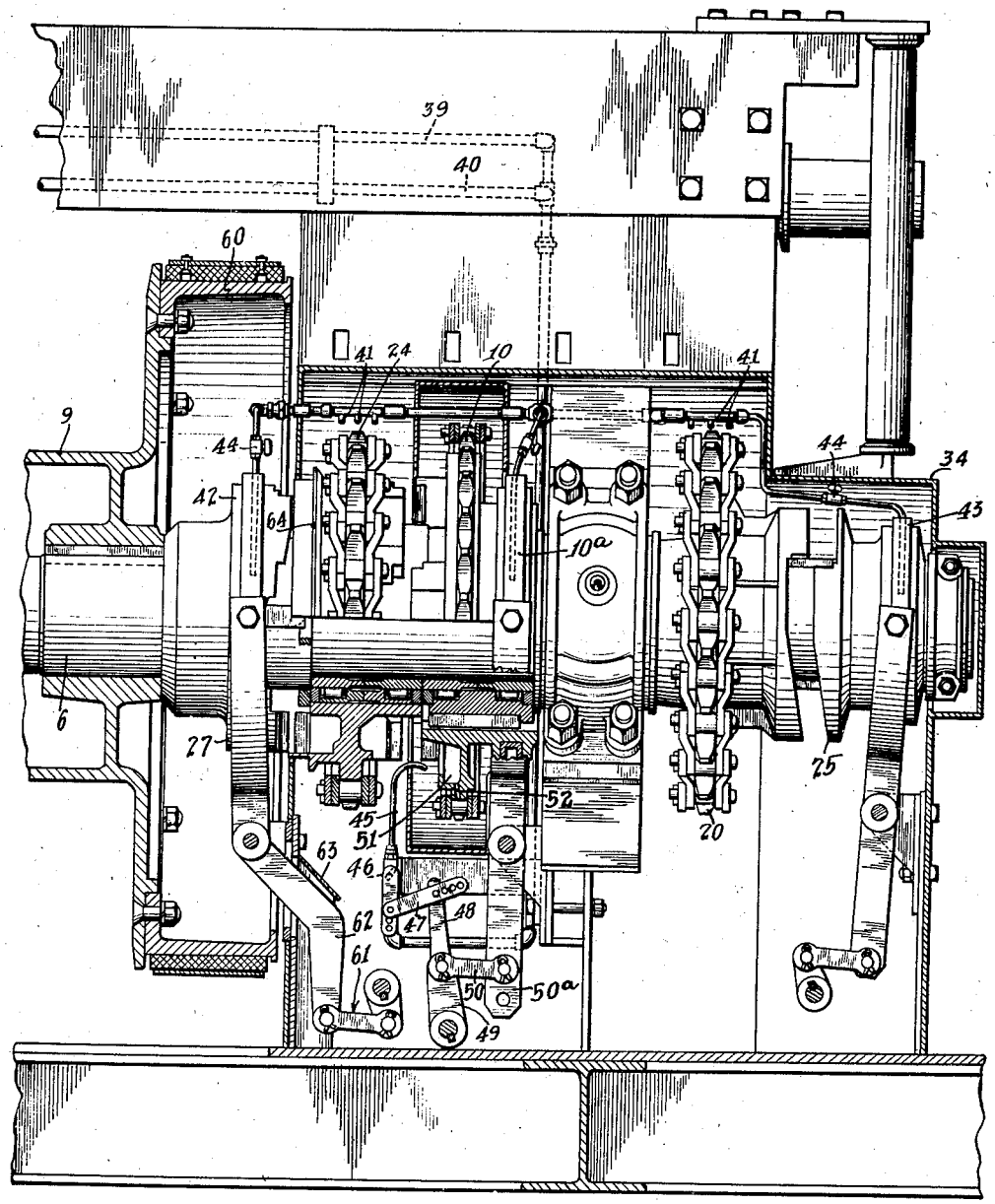

Patented May 6, 1941

2,240,737

UNITED STATES PATENT OFFICE 2,240,737

DRAWWORKS

Forrest J. Young, Los Angeles, Calif., assignor, by mesne assignments, to The National Supply Company, Pittsburgh, Pa., a corporation of Pennsylvania Application April 14, 1937, Serial No. 136,750

5 Claims. (Cl. 74—217)

This invention relates to rotary drawworks, and more particularly to drawworks of the type commonly employed in the drilling of wells.

An object of this invention is to provide a rotary drawworks applicable for use in connection with apparatus for drilling wells wherein means are provided for enclosing certain of the operating parts to protect the same wherein the enclosing means cooperates with the mechanism enclosed to provide for the suitable power take-off device.

Another object of this invention is to provide a rotary drawworks wherein there is included an enclosing means for the operating mechanism of the rotary drawworks which enclosure is formed in connection with the operating parts of the rotary drawworks to enable the operating parts to be advantageously positioned and is yet so constructed as to maintain lubricating oil from contact with the brake rim.

An object of this invention is to provide a rotary machine transmission element in a rotary drawworks which is capable of axial movement upon sliding means which is separate and distinct from the means allowing rotation.

Another object of this invention is to provide a rotary transmission element capable of axial transmission movement in the driving engagement and which is so constructed as to permit the use of a small diameter bearing.

Another object of this invention is to provide a rotary transmission element in a rotary drawworks capable of being shifted axially on its supporting shaft without shifting or changing the wearing surfaces of the bearing upon which such element rotates.

Other objects and advantages of this invention it is believed will be apparent from the following detailed description of a preferred embodiment thereof as illustrated in the accompanying drawings.

In the drawings:

Figure 1 is a perspective view of the rotary drawworks embodying my invention.

Figure 2 is a diagrammatic plan view thereof showing the arrangement of the drives and the positions of the enclosures and illustrating said enclosures in horizontal section.

Figure 4 is a fragmental front elevation partly in vertical mid-section illustrating the rotary drive and drum shaft drive means and enclosures at the right end of the drum shaft.

Figure 3:
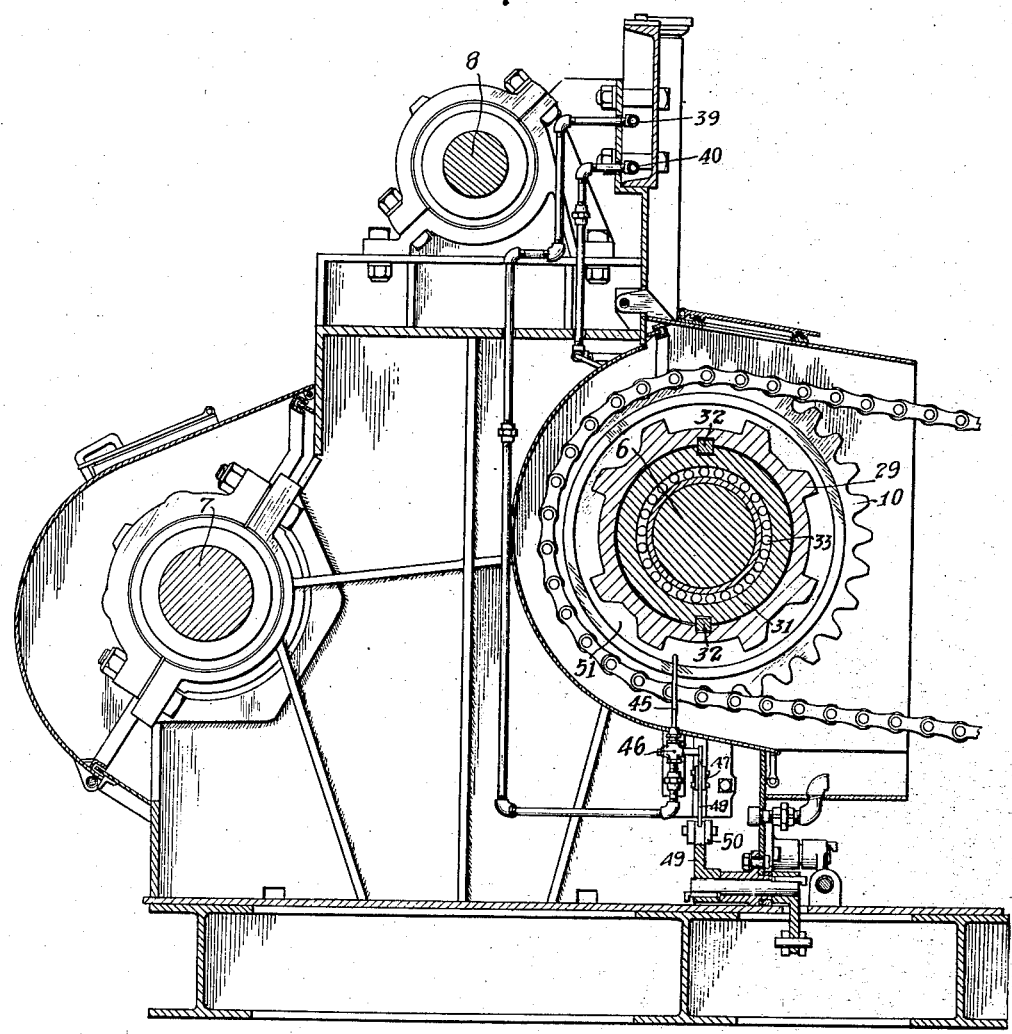
Figure 3 is a sectional end elevation taken substantially on the line 3—3 of Figure 2.

In the preferred embodiment of my invention as illustrated in the accompanying drawings, I indicates a base structure which is preferably formed of the frame work of suitably connected beams. The upper surface of the frame work is provided with a surface plate 2. Supported upon the base structure as thus formed are uprights or posts 3 and 4 which are connected together at their upper ends by means of a connecting beam 5. Rotatably supported by the uprights 3 and 4 is a drum shaft 6, a line shaft 7 and a cat shaft 8. A spooling drum 9 is secured to the drum shaft 6 between the pedestals 3 and 4.

In the illustration as shown in the accompanying drawings there are provided six driving speeds for the drum 9 and two driving speeds for the rotary machine drive sprocket 10. The drawworks is driven from a prime mover or source of power (not shown) which is connected to a sprocket 11 which is rotatably mounted upon the line shaft 7. Fixed in relation to the sprocket 11 and adapted to rotate therewith is a sprocket 12. The sprocket 12 is connected by a chain to one of a pair of countershaft sprockets 13 and 14. Countershaft sprockets 13 and 14 are rigidly fixed upon a rotatable sleeve 15 which is rotatably mounted upon a stationary countershaft 16. Sprocket 14 is aligned with, and connected through a chain with a sprocket 17 which is rotatably supported upon the line shaft 7. Splined upon the line shaft 7 between the sprockets 12 and 17 is a double jawed clutch 18 which is adapted to be engaged with either of the sprockets 12 or 17. The line shaft 7 may thus be driven at either one of two speeds for each speed of the prime mover.

Means are provided for driving the drum shaft 6 from the line shaft 7 and the means provided are such that three speeds are provided from the line shaft to the drum shaft. The means provided include the paired sprockets 19 and 20 connected by a chain, the sprockets 21 and 22 connected by a chain, and the sprockets 23 and 24 likewise connected by a chain.

The sprockets 19, 21 and 23 are fixed upon the line shaft 7 and their corresponding sprockets 20, 22 and 24 are rotatably mounted upon the drum shaft 6 and may be engaged therewith by their respective clutches 25, 26 and 27.

The rotary drive sprocket 10 is rotatably mounted upon the drum shaft 6 and serves to impart motion to the rotary machine drive sprocket 28 through a connecting chain. The rotary drive sprocket 10 is provided with jaws 29 which are adapted to be engaged with corresponding jaws 30 fixed upon the sprocket 24. Movement of the sprocket 10 along the shaft 6 brings the jaws 29 and 30 into engagement and at the same time aligns the sprockets 10 and 28 so that the chain connected between said sprockets is in motion only when the said sprockets are in alignment. It will be apparent from the foregoing that there is provided a two speed drive for the rotary machine sprocket 28 since the sprocket 23 may be driven at two speeds for each speed of the prime mover.

The rotary drive sprocket 10 is splined upon a sleeve 31 by means of keys 32. The sleeve 31 is rotatably supported by the shaft 6 upon the anti-friction bearing 33. The sleeve 31 is held from movement along the shaft 6. The sprocket 10 is axially movable along the sleeve 31 by means of keys 32, and as the sleeve 31 is rotatable upon the bearing 33, the bearing 33 does not shift axially along the shaft 6. This construction permits of the use of a bearing of small diameter, the inner and outer races of which do not shift axially.

In order to protect the operating parts of my rotary drawworks from the rotary mud used in the drilling process, or from other foreign matter, I prefer to provide enclosures for the principal operating parts and the provision of these enclosures enables me to provide an oiling system to insure adequate lubrication. The enclosures include enclosures 34, which encloses the bearing boxes 35 and 36 which are supported upon the pedestal 4, as well as the two chain drives through the sprockets 19 and 20 and 23 and 24. The enclosure likewise includes a sub-enclosure 37 which segregates the rotary drive sprocket 10 from the remainder of the enclosure, thus preventing any foreign matter which may be carried into the sub-enclosure by the rotary machine drive chain from finding its way to the other operating parts enclosed within the enclosure 34.

Covered inspection holes 38 are provided to permit access to the interior of the enclosure 34 without requiring removing of the sections thereof.

Means are provided for lubricating the operating parts within the enclosure 34, which means preferably include the conduits 39 and 40 provided with nozzles 41, positioned directly over the sprockets 20 and 24 so as to supply lubricant to the chains trained over the said sprockets. Conduit 40 is connected with the nozzles 41 and likewise is connected with the pipe extension which conveys the lubricant to the shifter rings 42 and 43 and 10ª of the clutches 25 and 27 and sprocket 10. Mounted in the conduits extending from the sprays 41 are valves 44 to adjust the rate of flow of oil as desired. Conduit 39 delivers oil to the rotary drive sprocket 10 through a nozzle 45. Mounted in the conduit 39 is an operating valve 46, the operating lever 47 of which is connected through a link 48 with a shifter crank 49. The crank 49 is in turn connected by a link 50 with a shifter fork 50ª by means of which the sprocket 10 is shifted along the shaft 6. When the sprocket 10 is shifted into driving engagement, the valve 46 is opened and lubricating oil flows into the recess 51 formed in the sprocket 10 within the teeth thereof.

Passages 52 are drilled radially between the teeth of the sprocket 10 to permit the lubricant to pass to the chain entrained upon the sprocket. When the rotary drive sprocket 10 is shifted back into its inoperative position as illustrated in Figure 4, the valve 46 is closed to stop the flow of oil. An enclosure 53 formed of several parts to permit of assembly is likewise provided to enclose the bearing boxes 54 and 55 mounted upon the pedestal 3. The enclosure 53 encloses the chain drive provided between the chain sprockets 21 and 22 and between the sprockets 56 and 57.

The cat shaft 8 is driven through the chain and sprocket connection provided between the sprockets 56 and 57. Sprocket 56 is rigidly secured to the shaft 7. Sprocket 57 is journaled upon the shaft 8, and a clutch 58 is provided for clutching the sprocket 57 to the cat shaft 8.

As illustrated in Figure 4, the clutch 27 is positioned within the brake rim 60 of the drum 9 for economy of space and is therefore outside of the enclosure 34. The sprocket 24 which is adapted to be engaged by the clutch 27 as well as the operating mechanism 61 which engages the clutch shifter 62 for the clutch 27 are both within the enclosure 34.

In order to permit of this enclosing of the operating parts, the clutch shifter 62 is extended through the wall of the enclosure 34 and a baffle 63 is provided at this point. At the point where the clutch 27 is projected through the enclosure 34 an oil thrower 64 is provided upon the sprocket 24 and forms an adequate seal at this point.

Figure 5:
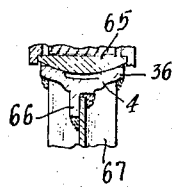
Figure 5 is a fragmental sectional view taken substantially on the line 5—5 of Figure 3.

The bearing boxes for the shafts 6 and 7 are mounted upon the pedestals 3 and 4. The pedestal 3 is built up of sections welded together. The bearing box 36 is supported upon the pedestal 4 and carries a self-aligning anti-friction bearing 65 (Figure 5) for the shaft 7. Bearing box 36 is provided with a depending lip 66 which is fixed against a web member of the pedestal 3 and is welded thereto as illustrated. Stiffener members 67 of the pedestal 4 are welded to the bearing box 36 to provide rigidity.

A cat head 68 is mounted on one end of the cat shaft 8, and provision is made at the other end of the cat shaft 8 to permit mounting of the so-called automatic cat head commonly employed in the art and the manner of mounting of which is well understood in the art.

Mounted upon the line shaft 7 within the enclosure 34 is a sprocket 69 for the purpose of driving any suitable or desirable auxiliary equipment such, for example, as a core reel located behind the drawworks. As illustrated in Figure 2, the sprocket 69 is provided with a clutch jaw 70 adapted to engage corresponding jaws 71 on the sprocket 23. Bearing construction and mounting for the auxiliary drive sprocket 69 may be the same as that illustrated for the rotary drive sprocket 10 as hereinabove described.

A chain 72, which is trained over the sprocket 69, extends through the opening 73 of the enclosure 34. If desired this opening may be closed when such auxiliary drive is not in use.

Having fully described my invention, it is to be understood that I do not wish to be limited to the details herein set forth, but my invention is of the full scope of the appended claims.

I claim:

1. In a drawworks having a drive shaft, a driven shaft, and transmission connections between the shafts, the combination of an enclosure surrounding said transmission connections, a power take-off sprocket mounted on the driven shaft, said sprocket being enclosed by a case extending into the space bounded by said enclosure, means independent of said shaft providing a releasable driving connection between said transmission connections and said power take-off sprocket, and a chain connected to said power take-off sprocket and extending exteriorly of said case to rotate a driven element.

2. In a drawworks having a drive shaft, a driven shaft, and transmission connections between the shafts, the combination of an enclosure surrounding said transmission connections, a power take-off sprocket mounted on the driven shaft, said sprocket being enclosed by a case extending into the space bounded by said enclosure, said case acting to isolate the sprocket from said space, drive means associated with one of said transmission connections, a chain connected to said power take-off sprocket and extending exteriorly of said case to rotate a driven element, said sprocket being movable within said case along the axis of the driven shaft to effect a driving engagement with said drive means, whereby said chain may drive said driven element.

3. In a drawworks having a drive shaft, a driven shaft parallel thereto, and a pair of transmission connections between the shafts, the combination of an enclosure surrounding said transmission connections and adapted to exclude foreign matter, a power takeoff sprocket mounted on one of said shafts between said pair of transmission connections, said sprocket being enclosed by a case extending into the chamber bounded by said enclosure, there being an opening in said case through which the sprocket drive chain extends, drive means in said enclosure associated with one of said transmission connections, said sprocket being laterally shiftable along the axis of its shaft to effect a driving engagement with said drive means and thereby drive the sprocket chain.

4. In a device of the class described, the combination of a shaft, a drive sprocket rotatably mounted on said shaft, a sleeve surrounding said shaft adjacent said drive sprocket, roller bearings carried by said shaft and adapted to rotatably support said sleeve, means to maintain said drive sprocket and said sleeve in axially spaced relation, a driven sprocket slidably mounted on said sleeve, means including a key to maintain the driven sprocket and sleeve in non-rotative relation, a chain connected to said driven sprocket, and shifter means adapted to move the driven sprocket and chain axially of the sleeve into driving engagement with the drive sprocket, whereby the driven sprocket may drive the chain.

5. In a drawworks having a line shaft, a drum shaft, and transmission connections between the shafts whereby the line shaft may drive the drum shaft, the combination of a drive member rotatably mounted on the drum shaft and associated with said transmission connections, a sleeve surrounding said shaft adjacent said drive member, bearing means carried by said shaft and adapted to rotatably support said sleeve, a power take-off sprocket keyed slidably on said sleeve and adapted for lateral movement axially of the drum shaft to a position of alignment with a sprocket to be driven thereby, a chain connecting said sprockets, and means rendered effective by movement of the power take-off sprocket to such position of alignment adapted to form a releasable driving connection between said drive member and said power take-off sprocket.

FORREST J. YOUNG.